US012477586B2

(12) United States Patent
Marcone et al.

(10) Patent No.: US 12,477,586 B2
(45) Date of Patent: Nov. 18, 2025

(54) STARTING RANDOM ACCESS CHANNEL OCCASION DETERMINATION FOR MULTIPLE PRACH TRANSMISSIONS FOR WIRELESS NETWORKS

(71) Applicant: NOKIA TECHNOLOGIES OY, Espoo (FI)

(72) Inventors: Alessio Marcone, Munich (DE); Marco Maso, Issy les Moulineaux (FR); Leonardo Chiarello, Munich (DE); Nhat-Quang Nhan, Reims (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/927,465

(22) Filed: Oct. 25, 2024

(65) Prior Publication Data
US 2025/0056624 A1 Feb. 13, 2025

Related U.S. Application Data

(63) Continuation of application No. PCT/IB2024/054655, filed on May 13, 2024.

(60) Provisional application No. 63/580,872, filed on Sep. 6, 2023, provisional application No. 63/502,406, filed on May 15, 2023.

(51) Int. Cl.
*H04W 4/00* (2018.01)
*H04W 74/0833* (2024.01)
(52) U.S. Cl.
CPC .............. *H04W 74/0833* (2013.01)
(58) Field of Classification Search
CPC ........... H04W 74/0833; H04W 74/006
See application file for complete search history.

(56) References Cited

U.S. PATENT DOCUMENTS

2022/0377799 A1* 11/2022 MolavianJazi ....... H04W 52/42
2022/0385381 A1* 12/2022 MolavianJazi ....... H04W 72/54
(Continued)

FOREIGN PATENT DOCUMENTS

WO WO-2023018122 A1 * 2/2023 .......... H04W 74/008
WO WO-2023055685 A1 * 4/2023 .......... H04W 72/046

OTHER PUBLICATIONS

International Search Report and Written Opinion for International Application No. PCT/IB2024/054655, mailed on Jul. 10, 2024, 15 pages.
(Continued)

*Primary Examiner* — Thai Dinh Hoang
(74) *Attorney, Agent, or Firm* — Brake Hughes Bellermann LLP

(57) ABSTRACT

A method includes determining, by a user device in a wireless network, at least one starting random access channel occasion (RO), wherein each of the at least one starting RO is a first valid RO of an RO set for a physical random access (PRACH) transmission with preamble repetitions, wherein the determining the at least one starting RO is based at least on valid ROs; determining, by the user device, an RO set for the PRACH transmission with preamble repetitions based on the determined at least one starting RO, the determined RO set including one of the at least one starting RO; and transmitting, by the user device to a network node, the PRACH transmission with preamble repetitions using the determined RO set.

18 Claims, 11 Drawing Sheets

(56) References Cited

U.S. PATENT DOCUMENTS

| | | | |
|---|---|---|---|
| 2023/0085104 A1* | 3/2023 | Park | H04L 1/08 370/329 |
| 2023/0105152 A1* | 4/2023 | Lin | H04L 27/26025 370/329 |
| 2023/0108510 A1* | 4/2023 | Wang | H04L 5/0051 370/329 |
| 2023/0284039 A1* | 9/2023 | Lin | H04W 16/28 |
| 2024/0073963 A1* | 2/2024 | Lin | H04W 74/006 |

OTHER PUBLICATIONS

3GPP TSG RAN WG1 #112bis-e, e-Meeting; R1-2303508; "Discussion on PRACH Coverage Enhancement"; Agenda Item: 9.12.1; Source: Apple Inc.; Apr. 17-26, 2023; 4 pages.

3GPP TSG RAN WG1 #112bis-e; e-Meeting; R1-2303750; "Discussion on PRACH Repeated Transmission for NR Coverage Enhancement"; Agenda Item: 9.12.1; Source: LG Electronics; Apr. 17-Apr. 26, 2023; 14 pages.

3GPP TSG RAN WG1 #112-bis-e, e-meeting; R1-2302880; "PRACH Coverage Enhancements"; Agenda Item: 9.12.1; Sources: Nokia, Nokia Shanghai Bell; Apr. 17-26, 2023, 24 pages.

3GPP TS 38.213; V17.5.0; 3rd Generation Partnership Project; Technical Specification Group Radio Access Network; NR; Physical Layer Procedures for Control (Release 17); Mar. 2023; 262 pages.

3GPP TS 38.211; V17.4.0; 3rd Generation Partnership Project; Technical Specification Group Radio Access Network; NR; Physical Channels and Modulation (Release 17); Dec. 2022; 136 pages.

3GPP TSG RAN Meeting #94e; RP-213579 (revision of RP-213551); "New WI: Further NR Coverage Enhancements"; Source: China Telecom; Agenda Item: 8.6.1; Dec. 6-17, 2021; 5 pages.

3GPP TS 38.331, V17.4.0; 3rd Generation Partnership Project; Technical Specification Group Radio Access Network; NR; Radio Resource Control (RRC) Protocol Specification (Release 17); Mar. 2023; 1324 pages.

* cited by examiner

Table 8.1-1: Mapping between PRACH configuration period and SS/PBCH block to PRACH occasion association period

| PRACH configuration period (msec) | Association period (number of PRACH configuration periods) |
|---|---|
| 10 | (1, 2, 4, 8, 16) |
| 20 | (1, 2, 4, 8) |
| 40 | (1, 2, 4) |
| 80 | (1, 2) |
| 160 | (1) |

FIG. 4

STARTING RANDOM ACCESS CHANNEL OCCASION DETERMINATION FOR MULTIPLE PRACH TRANSMISSIONS FOR WIRELESS NETWORKS

RELATED APPLICATIONS

This application is a continuation of International Application No. PCT/IB2024/054655, filed May 13, 2024, which claims priority to U.S. Provisional Application No. 63/502,406, filed on May 15, 2023, and U.S. Provisional Application No. 63/580,872, filed on Sep. 6, 2023, each of which is incorporated herein by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G and 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency. 6G wireless networks, and other wireless networks, are also being developed.

SUMMARY

According to an example embodiment, a method may include determining, by a user device in a wireless network, at least one starting random access channel occasion (RO), wherein each of the at least one starting RO is a first valid RO of an RO set for a physical random access (PRACH) transmission with preamble repetitions, wherein the determining the at least one starting RO is based at least on valid ROs; determining, by the user device, an RO set for the PRACH transmission with preamble repetitions based on the determined at least one starting RO, the determined RO set including one of the at least one starting RO; and transmitting, by the user device to a network node, the PRACH transmission with preamble repetitions using the determined RO set.

An apparatus may include at least one processor; and at least one memory including computer program code; the at least one memory and the computer program code configured to, with the at least one processor, cause the apparatus at least to: determine, by a user device in a wireless network, at least one starting random access channel occasion (RO), wherein each of the at least one starting RO is a first valid RO of an RO set for a physical random access (PRACH) transmission with preamble repetitions, wherein the determining the at least one starting RO is based at least on valid ROs; determine, by the user device, an RO set for the PRACH transmission with preamble repetitions based on the determined at least one starting RO, the determined RO set including one of the at least one starting RO; and transmit, by the user device to a network node, the PRACH transmission with preamble repetitions using the determined RO set.

According to an example embodiment, a method may include receiving, by a user device from a network node, configuration information for random access, wherein the configuration information comprises a plurality of synchronization signal blocks (SSBs) and a plurality of random access channel occasions (ROs), the plurality of ROs are divided into a plurality of RO groups; determining, by the user device, a set of starting ROs of the plurality of RO groups based on at least validity of the starting ROs; selecting by the user device, a RO group from the plurality of RO groups based on the set of starting ROs; and transmitting, by the user device to the network node, a plurality of physical random access channel (PRACH) transmissions using ROs of the selected RO group during the random access.

According to an example embodiment, an apparatus may include at least one processor; and at least one memory including computer program code; the at least one memory and the computer program code configured to, with the at least one processor, cause the apparatus at least to: receive, by a user device from a network node, configuration information for random access, wherein the configuration information comprises a plurality of synchronization signal blocks (SSBs) and a plurality of random access channel occasions (ROs), the plurality of ROs are divided into a plurality of RO groups; determine, by the user device, a set of starting ROs of the plurality of RO groups based on at least validity of the starting ROs; select by the user device, a RO group from the plurality of RO groups based on the set of starting ROs; and transmit, by the user device to the network node, a plurality of physical random access channel (PRACH) transmissions using ROs of the selected RO group during the random access.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description

BRIEF DESCRIPTION OF THE DRAWINGS

FIG. 4 is Table 8.1-1 from TS 38.213 indicating a mapping between PRACH configuration period and an association period.

DETAILED DESCRIPTION

Figure 1:
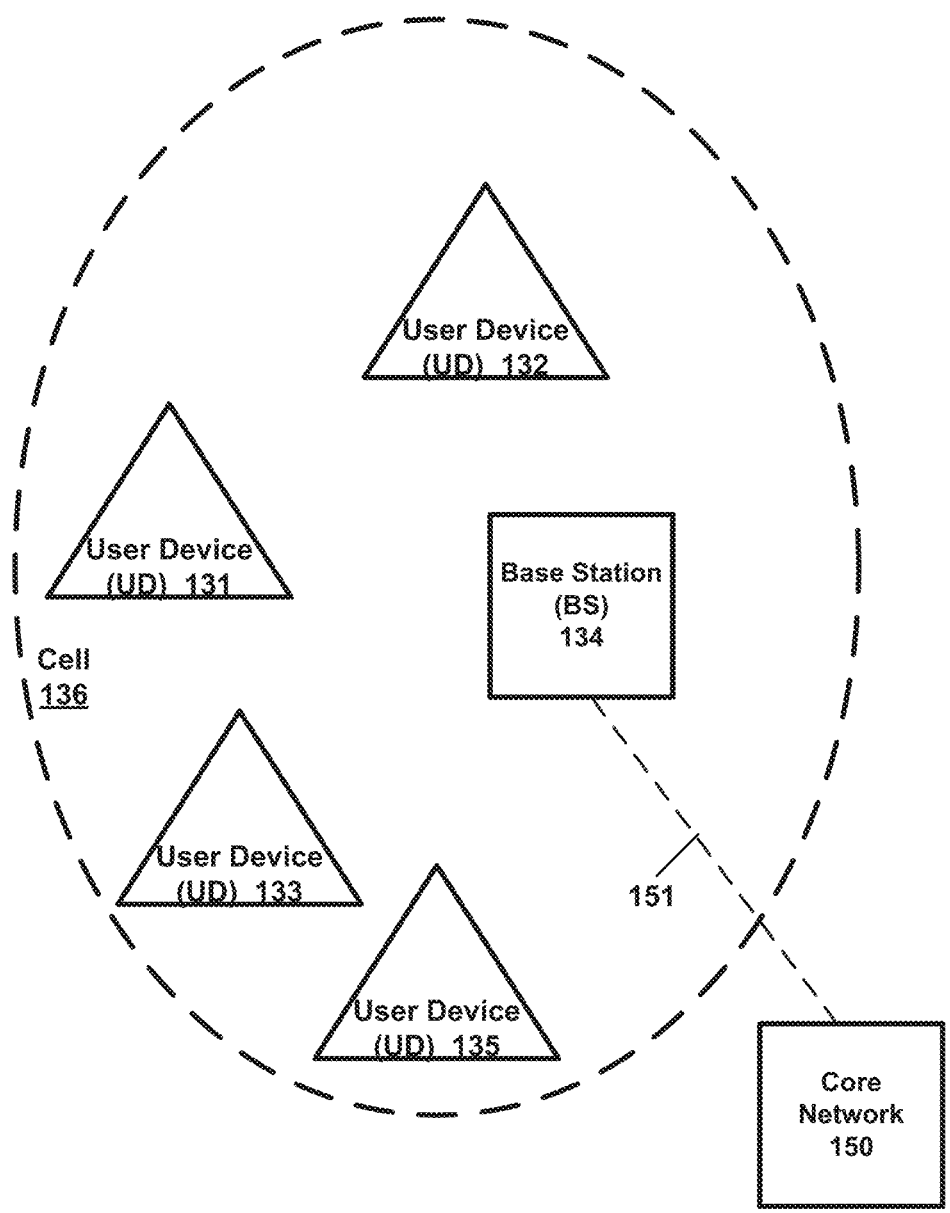
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS or split gNB). At least part of the functionalities of a BS (e.g., access point (AP), base station (BS) or (e) Node B (eNB), gNB, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a/centralized unit (CU) and/or a distributed unit (DU) in the case of a split BS or split gNB), or other network node.

According to an illustrative example, a BS node (e.g., BS, eNB, gNB, CU/DU, ... ) or a radio access network (RAN) may be part of a mobile telecommunication system.

A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, ... ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node or network node (e.g., BS, eNB, gNB, CU/DU, ... ) may forward data to the UE that is received from a network or the core network, and/or forward data received from the UE to the network or core network. RAN nodes or network nodes (e.g., BS, eNB, gNB, CU/DU, ... ) may perform a wide variety of other wireless functions or services, e.g., such as broadcasting control information (e.g., such as system information or on-demand system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform.

A user device or user node (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. Also, a user node may include a user equipment (UE), a user device, a user terminal, a mobile terminal, a mobile station, a mobile node, a subscriber device, a subscriber node, a subscriber terminal, or other user node. For example, a user node may be used for wireless communications with one or more network nodes (e.g., gNB, eNB, BS, AP, CU, DU, CU/DU) and/or with one or more other user nodes, regardless of the technology or radio access technology (RAT).

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)), and/or 6G, may also include a core network.

In addition, the techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network nodes. For example, many sensor type applications or devices may monitor a physical condition or a status, and may send a report to a server or other network node, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems.

This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The techniques described herein may be applied to a wide variety of wireless technologies or wireless networks, such as 5G (New Radio (NR)), cmWave, and/or mmWave band networks, IoT, MTC, eMTC, eMBB, URLLC, 6G, etc., or any other wireless network or wireless technology. These example networks, technologies or data service types are provided only as illustrative examples.

At least in some example cases, a UE may be in one of multiple states (e.g., such as one of three Radio Resource Control (RRC) states) with respect to a network node or gNB. In an Idle state (RRC Idle), there is typically no (or limited) RRC context (where a RRC context may include information or parameters necessary for communication between the UE and gNB/network node) stored in the RAN (radio access network) node (e.g., gNB) or network node, or UE, and the UE does not belong (or is not connected to) to a specific cell. From a core network perspective, the Idle UE is in an Idle (CM_Idle) state. No data transfer may typically occur between a UE and network node (e.g., gNB) when the UE is in an Idle state, as the UE sleeps (in a low power state) most of the time to conserve power. In an Idle state, a UE may typically periodically wake up to receive paging messages from the network.

A UE may transition from Idle state (e.g., RRC Idle) to a Connected state (e.g., RRC Connected state, where the UE is connected to the network node) by performing a random access (RACH) procedure with the gNB or network node. As part of the RACH procedure, both the UE and network node (e.g., gNB) may obtain the context, e.g., communication parameters necessary to allow UE-gNB communication. As an example communication parameter, the UE may obtain, e.g., as part of a RACH procedure with gNB or network node, a timing advance to allow the UE to perform uplink transmission to the gNB. The UE may also obtain a UE identity from the network, e.g., such as a cell-radio network temporary identifier (C-RNTI), which may be used by the UE for communication or signaling with the network or gNB. In a connected state (e.g., RRC Connected) with respect to a cell (or gNB or DU), the UE is connected to a gNB or network node, and the UE may receive data, and may send data (e.g., based on receiving an uplink grant).

In 5G NR (for example), two contention based random access (CBRA) procedures are supported, namely 4-step random access (4-step RACH) (Rel-15) and 2-step random access (2-step RACH) (Rel-16).

Figure 2A:
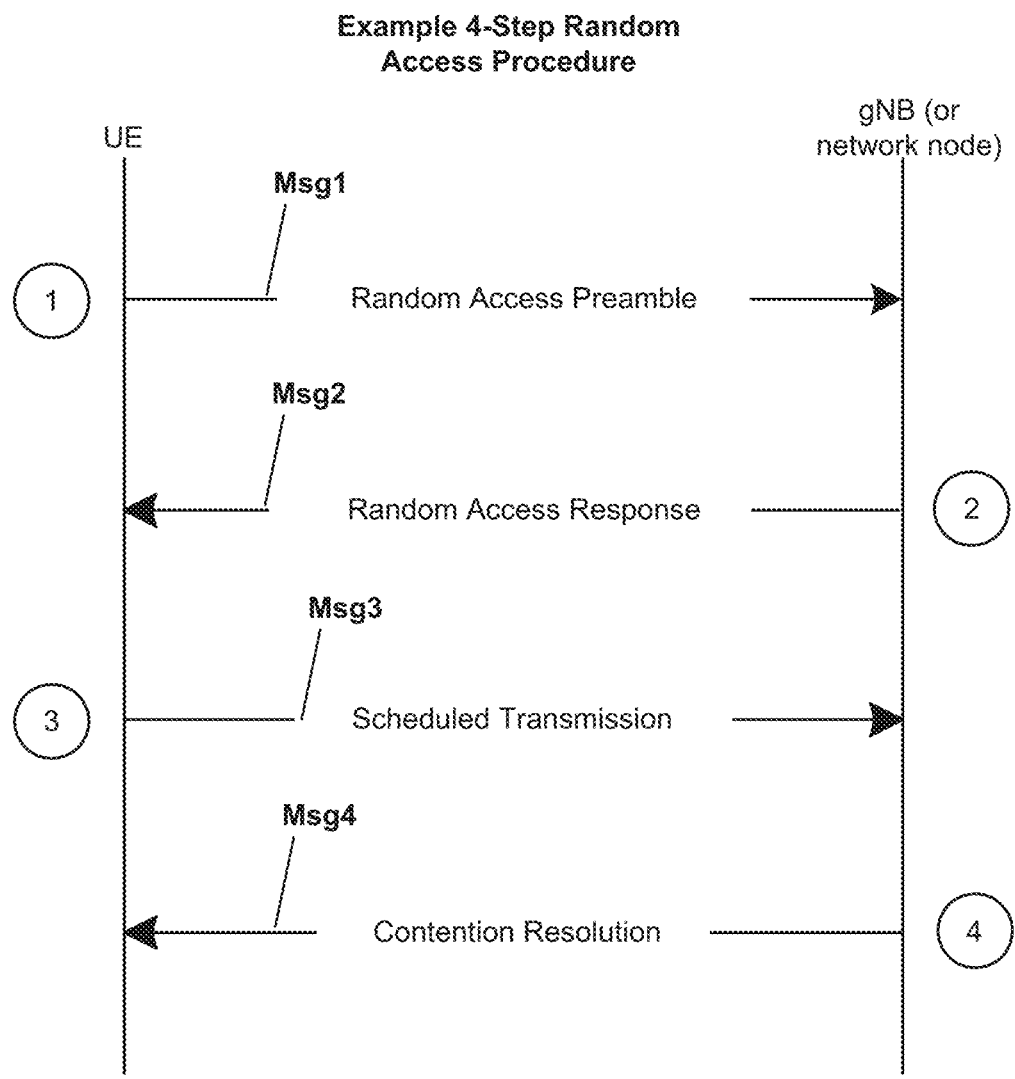
FIG. 2A is a diagram illustrating operations of a 4-step random access (RACH) procedure according to an example embodiment.

FIG. 2A is a diagram illustrating operations of a 4-step random access (RACH) procedure according to an example embodiment. Each of these four steps of the 4-step RACH procedure will be briefly described: When the RACH procedure is triggered (caused to be performed by the UE), at step 1, the UE sends Msg1 (or message 1) of the random access (RACH) procedure. 1. Msg1 (also known as physical random access channel or PRACH or random access preamble): UE transmits a specific random access preamble to the gNB via physical random-access channel (PRACH) using a specific resource called PRACH occasion or RACH occasion (RO). The RO is a set of time-frequency resources that the UE uses to transmit the PRACH (or random access preamble). There are different groups of random access preambles defined or configured. The UE obtains information on how to access the RACH channel from system information block 1 (SIB1) broadcasted in the system information (S1) from the gNB.

With respect to FIG. 2A, after receiving message 1 (PRACH or random access preamble from the UE), the gNB determines the receive timing of the received random access preamble (PRACH). Based on the receive timing of the received preamble (if there are no collisions with other UEs), the gNB determines a timing advance (or TA or timing advance command) to adjust the timing of the UE uplink frame to align with a downlink frame (and also to align uplink receive timing with other UE uplink frames). Because each UE may be provided at a different location, each UE may have a different radio propagation delay, and thus a different or specific timing advance with respect to a gNB.

As shown in FIG. 2A, at Step 2 (Msg2 or message 2), the gNB responds to the UE with a random access response (RAR), which may include an index to (or identifier of) the received random access preamble (or PRACH) (index or identifier of a random access preamble resource) (also known as RAPID or random access preamble identifier), the timing advance (TA, or timing advance command), a temporary cell-radio network temporary identifier (TC-RNTI) assigned to the UE, and an uplink (UL) grant (e.g., including scheduling information and/or information indicating resources to be used for UL transmission) to be used by the UE for uplink transmission of message 3 (Msg3). Thus, at step 2, the gNB transmits Msg2 (message 2, also known as a random access response (RAR)). Thus at step 2, the gNB replies to msg1 with a random-access response (RAR) message, which includes the detected preamble ID (or RAPID), the time-advance command, a TC-RNTI, and an UL grant for the transmission of Msg3 on PUSCH (physical uplink shared channel).

Also, as shown in FIG. 2A, at step 3, upon receiving the RAR message (Msg2), the UE may send the first uplink transmission to the network (Msg3 or message 3). The size of the transmission of Msg3 depends on the grant received at step 2 (Msg2 or message 2). Thus, at step 3, the UE responds to Msg2 by transmitting Msg3 (also known as a RRC request) over the scheduled PUSCH with an ID for contention resolution.

Step 4 (Msg 4 or message 4) of FIG. 2A may include transmission of a DL message from gNB to UE that involves the contention resolution phase. Thus, gNB may transmit Msg4 (a.k.a. RRC setup, which may be a contention resolution message) with a contention-resolution ID (contention resolution identifier). After a UE is connected to a gNB (e.g., after the random access procedure is completed), the UE may receive an updated timing advance (TA) value or TA command from the serving gNB or serving cell.

Upon reception of Msg4, the UE sends an ACK (acknowledgement) on a PUCCH (physical uplink control channel) if its contention-resolution ID is carried by Msg4. This completes the 4-step RACH procedure.

In addition, prior to Msg1, there is also a preliminary step of gNB sending and the UE receiving the synchronization signal block (SSB), i.e., which may involve the gNB performing downlink (DL) beam sweeping to transmit different SSB beams (each associated with a different SSB index) in different directions, which is not formally part of the RACH procedure. As a result of this preliminary step of SSB transmission by gNB and SSB reception (and possibly UE measurement of reference signal receive power of one or more SSB beams to select one of these SSB indexes), the UE selects the index of the preferred SSB beam and decodes the associated PBCH for MIB, SIB and so on. This index is also used by UE to identify a suitable RO for the preamble transmission (Msg1), according to the SSB-to-RO mapping implicitly conveyed by SIB1.

Figure 2B:
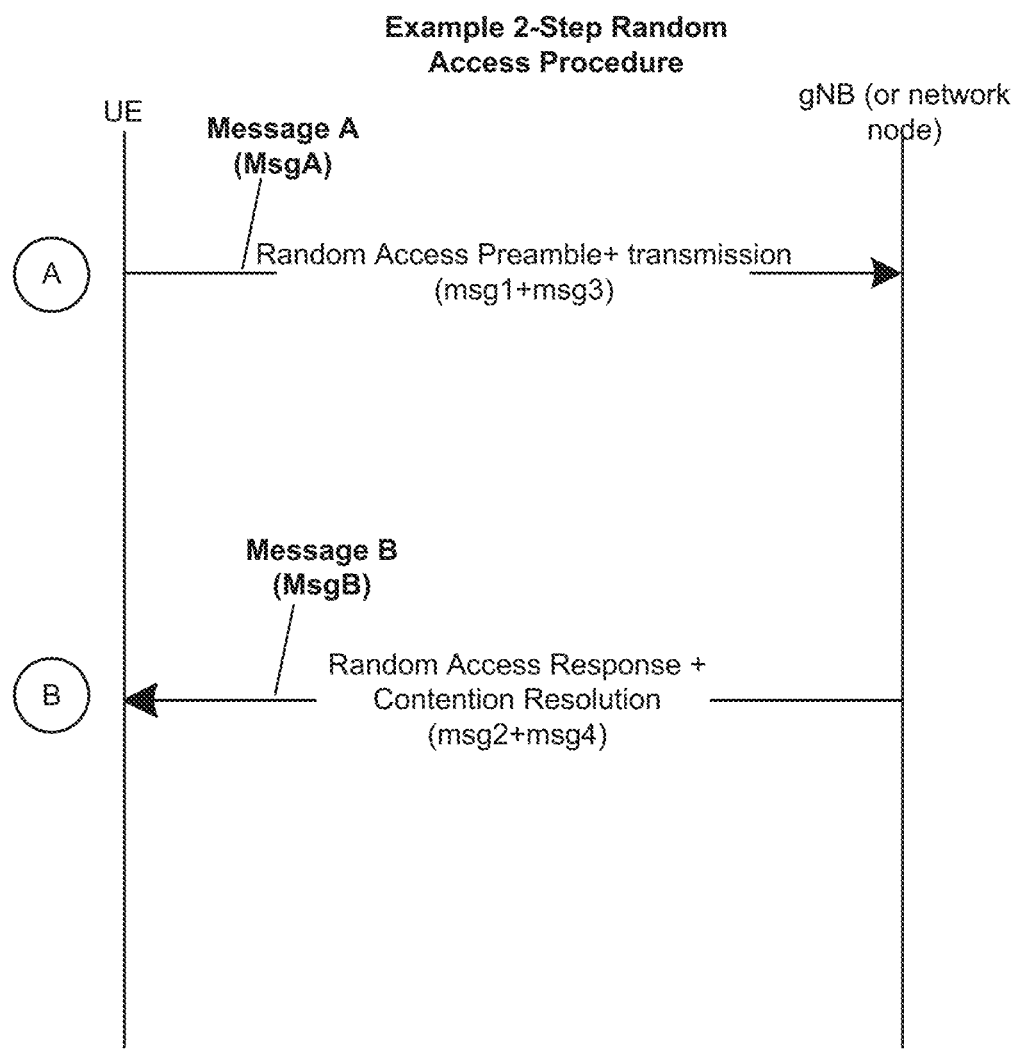
FIG. 2B is a diagram illustrating operations of a 2-step random access (RACH) procedure according to an example embodiment.

Furthermore, as an alternative RACH procedure, a 2-step RACH (random access) procedure may be used to provide a faster random access procedure. FIG. 2B is a diagram illustrating operations of a 2-step random access (RACH) procedure according to an example embodiment. At message A (MsgA), a UE may transmit a message that includes contents of both Msg1 and Msg3 as a first message (MsgA) of the 2-step RACH procedure. And, for example, the network node or gNB may transmit Msg2 and Msg4 as a second message (or MsgB or message B) of the 2-step RACH procedure.

Figure 3:
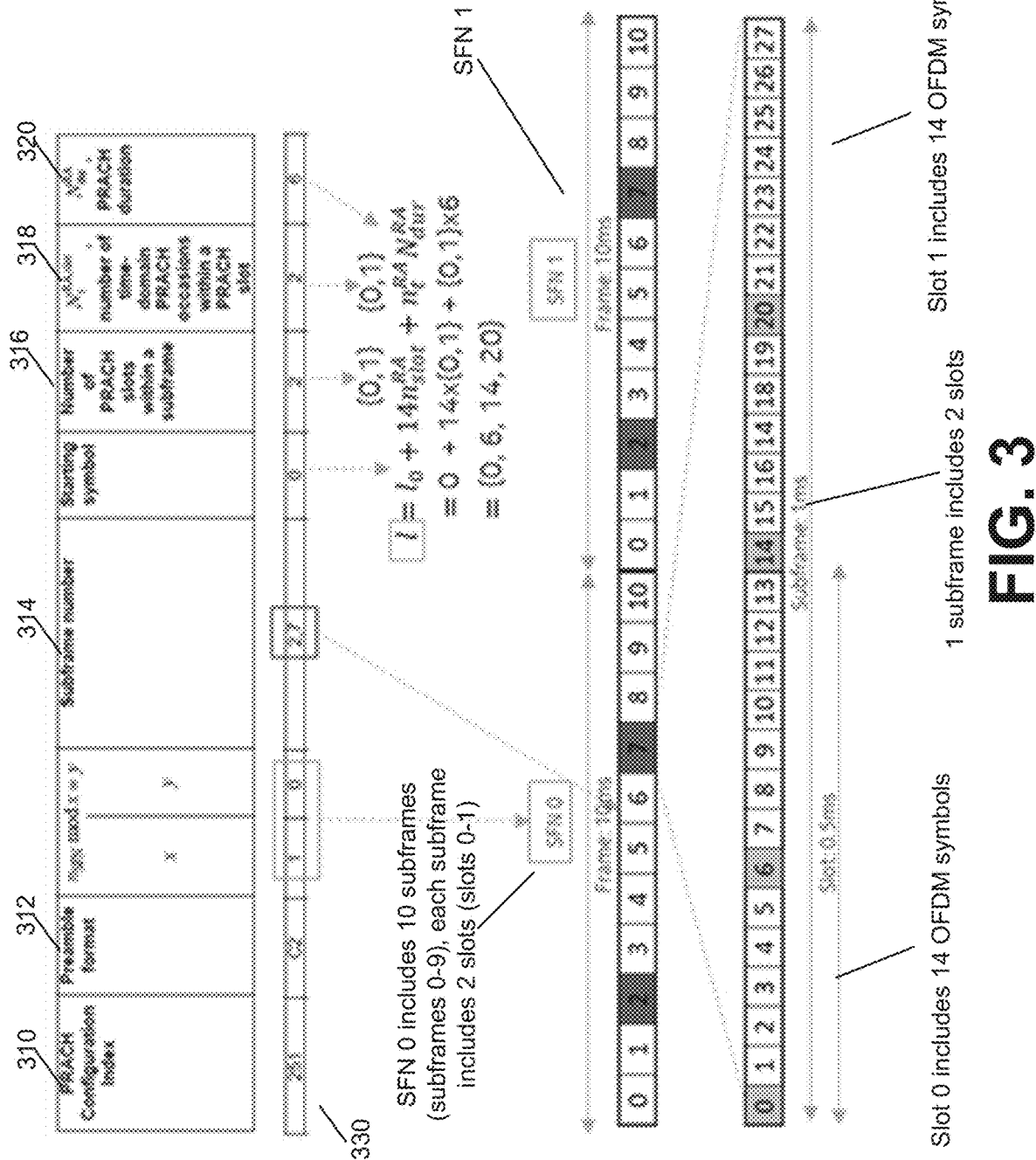
FIG. 3 is a diagram illustrating an example of time-domain resource determination for RACH occasions (ROs), wherein the prach-ConfigurationIndex is 251.

Configuration of RACH Occasions (ROs) (in Time Domain):

The time-domain resource for RACH occasions (ROs) is RRC configured by prach-ConfigurationIndex (in rach-ConfigGeneric), which acts as an indicator to a row (e.g., see row 330 FIG. 3 as an example) of a table specified in TS 38.211 (clause 6.3.3.2). With the parameters indicated by prach-ConfigurationIndex, the UE determines the preamble format for PRACH and applies the procedure specified in TS 38.211 (clause 5.3.2) to find the ROs in time-domain. FIG. 3 is a diagram illustrating an example of time-domain resource determination for RACH occasions (ROs), wherein the prach-ConfigurationIndex is 251. For example, this PRACH configuration index indicates or may map to a set of configuration parameters (e.g., values of parameters indicated at row 330), such as configuration parameters 310, 312, 314, 316, 318 and 320, as examples, based on this PRACH configuration Index (e.g., prach-ConfigurationIndex)=251, in this example. The index of 251 indicated is just an example, and other PRACH configuration index values may be used to indicate different (or other) configuration parameters for RACH occasions (ROs).

As shown in the example of FIG. 3, each system frame (e.g., for system frame numbers (SFN) 0 and 1 are shown) includes 10 subframes, and each subframe includes 2 slots (for example), and each slot includes 14 OFDM (orthogonal frequency division multiplexing) symbols.

With the PRACH configuration Index=251, this configures (or indicates) values for various parameters as shown in row 330, and the UE may determine the value for these configuration parameters, such as for example: PRACH configuration index (310)=251; preamble format (312)=C2; Subframe number (314)=2, 7; a number of PRACH slots (316) within a subframe=2; number of time domain ROs (PRACH or RACH occasions) within PRACH slot (318)=2; and a PRACH duration (320)=6. Other parameters may also be indicated based on the index=251. These indicate ROs configured in the time domain. One or more ROs may be configured in frequency domain (e.g., multiple ROs may be configured at same time, using different sets of subcarriers, for example).

Thus, based on these parameters of row 330 (based on index=251), the following configuration for ROs is configured or should be used:

Preamble format C2 should be used.

ROs are allocated at the system frame numbers (n_SFN) that satisfy n_SFN mod 1=0 (i.e., all SFN numbers are valid).

Within each of the determined SFNs (system frame numbers), ROs are allocated at subframe numbers 2 and 7.

Within each of the determined subframes, the remaining parameters in the considered row indicate that ROs will start at symbol number 0, 6, 14, 20. The symbol number is continuously counted regardless of the number of slots within the subframe, which depends on the sub-carrier spacing configured for PRACH. In this example, a RO duration is 6 symbols (although the actual duration of the preamble format can be less than that).

Also, UE may need to determine or confirm a validity of the ROs, before the ROs can be used to transmit a PRACH. According to TS 38.213 (clause 8.1) a RO is determined as valid, if it is within UL symbols or if it has a sufficient (e.g., threshold or minimum) gap after the last SSB (synchronization signal block)/DL (downlink) symbol.

Configuration of RACH Occasions (ROs) (in Frequency Domain):

In some higher layer signaling that carries PRACH configuration, gNB may also indicate two parameters to convey frequency resources for the ROs in UE uplink BWP (bandwidth part). These frequency related parameters may include frequency information, such as frequency (or frequency resources) where the ROs start, and how many ROs are frequency multiplexed. The parameters msg1-FrequencyStart and msg1-FDM configured in RACH-ConfigGeneric indicate the offset of the lowest RO in frequency domain from the start of the UE uplink bandwidth part and the number of ROs multiplexed in frequency domain for each time instance, respectively. Such ROs are indexed as n_RA={0, 1, . . . , M−1}, where M equals the higher-layer parameter msg1-FDM, and are numbered in increasing order within the UE uplink bandwidth part, starting from the lowest frequency. The number of occupied resource blocks per RO, which may be expressed in number of RBs (resource blocks, where each resource block is a set of time-frequency resources) for PUSCH, is specified in Section 6.3.3.2 of TS 38.211, depending on the configured preamble length and sub-carrier spacings for PRACH and PUSCH.

SSB to RO Mapping:

As noted above, the UE may determine an RO for transmitting a PRACH (carrying random access preamble or Msg1, to perform random access to a gNB) based on a selected (e.g., best or strongest) SSB measured by the UE from the gNB. A UE may map SSB indexes to the determined ROs so that the UE can determine which ROs are associated to the SSB index selected by UE during the preliminary step before the start of the RACH procedure. The different SSB indexes are beamformed in different directions in the cell, hence selection of a wrong SSB index may cause a failure of the RACH procedure (e.g., since the random access preamble or PRACH may not be received if it is transmitted via a wrong SSB). To this purpose, one fundamental parameter ssb-perRACH-OccasionAndCB-PreamblesPerSSB is configured in RACH-ConfigCommon and indicates two information: (i) the number of SSB indexes per RO, and (ii) the number of contention-based preambles per SSB index. There may be multiple consecutive ROs mapped to same SSB index. Once this information is available to a UE, the UE maps the SSB indexes to the time-frequency grid of ROs (determined as described above) in increasing order of frequency resource indices, time resource indices of the ROs within a PRACH slots, and the PRACH slots, sequentially.

In relation to the SSB-to-RO mapping, TS 38.213 defines an association period, starting from frame 0, for mapping SSB indexes to RACH occasions (i.e., ROs) as the smallest value in the set determined by the PRACH configuration period according to Table 8.1-1 (shown in FIG. 4) such that all of the SSB indexes are mapped at least once to the RACH occasions within the association period. FIG. 4 is Table 8.1-1 from TS 38.213 indicating a mapping between PRACH configuration period and an association period.

The PRACH configuration period referred to here is determined at the UE based on the configured PRACH configuration index. Also, an association pattern period includes one or more association periods and is determined so that a pattern between RACH occasions (ROs) and SS/PBCH block (SSB) indexes repeats at most every 160 msec. RACH occasions (ROs) not associated with SS/PBCH (SSB) block indexes after an integer number of association periods, if any, are not used for PRACH transmissions. The pattern of the mapping between ROs and SSB indexes repeats. And this mapping (of ROs to SSB indexes) repeats in a period referred to as the association pattern period.

In addition, according to an example embodiment, a UE may perform multiple PRACH (random access preamble) transmissions (e.g., PRACH repetitions) via a plurality of ROs, e.g., via a same UE transmit beam, and/or the gNB may receive the plurality of PRACH transmissions via a same SSB beam. The plurality of ROs used by a UE to perform multiple PRACH transmissions may be referred to as a RO group. For multiple PRACH transmissions with same Tx beam, "RO group" is assumed for multiple PRACH transmissions with separate preamble on shared ROs and/or multiple PRACH transmissions on separate ROs, and one RO group consists of valid RO(s) for a specific number of multiple PRACH transmissions. For example, all ROs in one RO group may be associated with the same SSB(s). Shared or separate RO/preamble means that the RO/preamble is shared or separated with single PRACH transmission.

According to an example embodiment, a RO may be evaluated to determine if it is valid (see validity rules noted above). In addition, when determining whether ROs of an RO group can be used for PRACH transmission, a UE may also consider (or be based on) whether there is a collision between an RO of an RO group and other ROs for other configurations, e.g., for single PRACH transmission. For example, as an example of a RO collision, the UE may determine whether an RO of an RO group for PRACH repetitions occurs in the same time instance (but different frequency) of at least one other RO reserved for other configurations (e.g., such as for single PRACH transmission), and the two ROs are mapped to different SSB indexes (i.e., different gNB receive beams), in some implementations where a gNB can only have one beam active per time instance. This example of RO collision may lead to the gNB being incapable of receiving preambles sent in both ROs. Specifically, for example, if the gNB prioritizes the other RO, the PRACH transmission on the RO for the PRACH repetitions would be lost (not received by gNB). For this reason, an additional validation rule may be applied by UE so that the PRACH transmission in the one RO of the RO group for PRACH repetitions occurring in the same time instance as the other RO would be dropped or discarded from the RO group and UE would transmit a lower number of PRACH repetitions. However, in another example embodiment, the UE may determine ROs (such as a starting RO) of a RO group regardless of whether a RO collision exists for that RO of the RO group. Also, for example or in some cases, a UE may determine ROs, such as a set of starting ROs for a plurality of RO groups, regardless of collision handling rules applied. The starting ROs of RO groups are described in greater detail below.

An issue or challenge that exists is how to define RO groups, e.g., which may involve determining which ROs are part of each RO group. It may be important for the UE and gNB to understand a starting point and ending point (or to determine the ROs) of an RO group for multiple PRACH transmissions (PRACH repetition), e.g., to allow the gNB to know which received PRACHs should be combined. According to an example embodiment, a starting RO may be determined for each of one or more groups, which may be the first RO of the RO group, for example. In some cases, ROs of a RO group may use the same set of frequency resources, with ROs having different times. In another example, at least some of the ROs of a RO group may use the same time resources (same OFDM symbols or same time for each of the RO of the RO group, e.g., all ROs of the group occur at the same time) and multiplexed onto different frequency resources. Also, ROs of a group may use frequency hopping, i.e., ROs of a group at different time instances may use different sets of frequency resources. Thus, while there may be different configurations of a RO group, a RO group may be determined based on a starting RO of the RO group. For example, a UE and gNB may be able to determine the RO group if the starting RO of the RO group has been determined. As an example, once the starting RO of the RO group e.g., and a number of ROs of the RO group are known, the UE may be able to determine the ROs of the RO group, e.g., based on the configuration.

Figure 5:
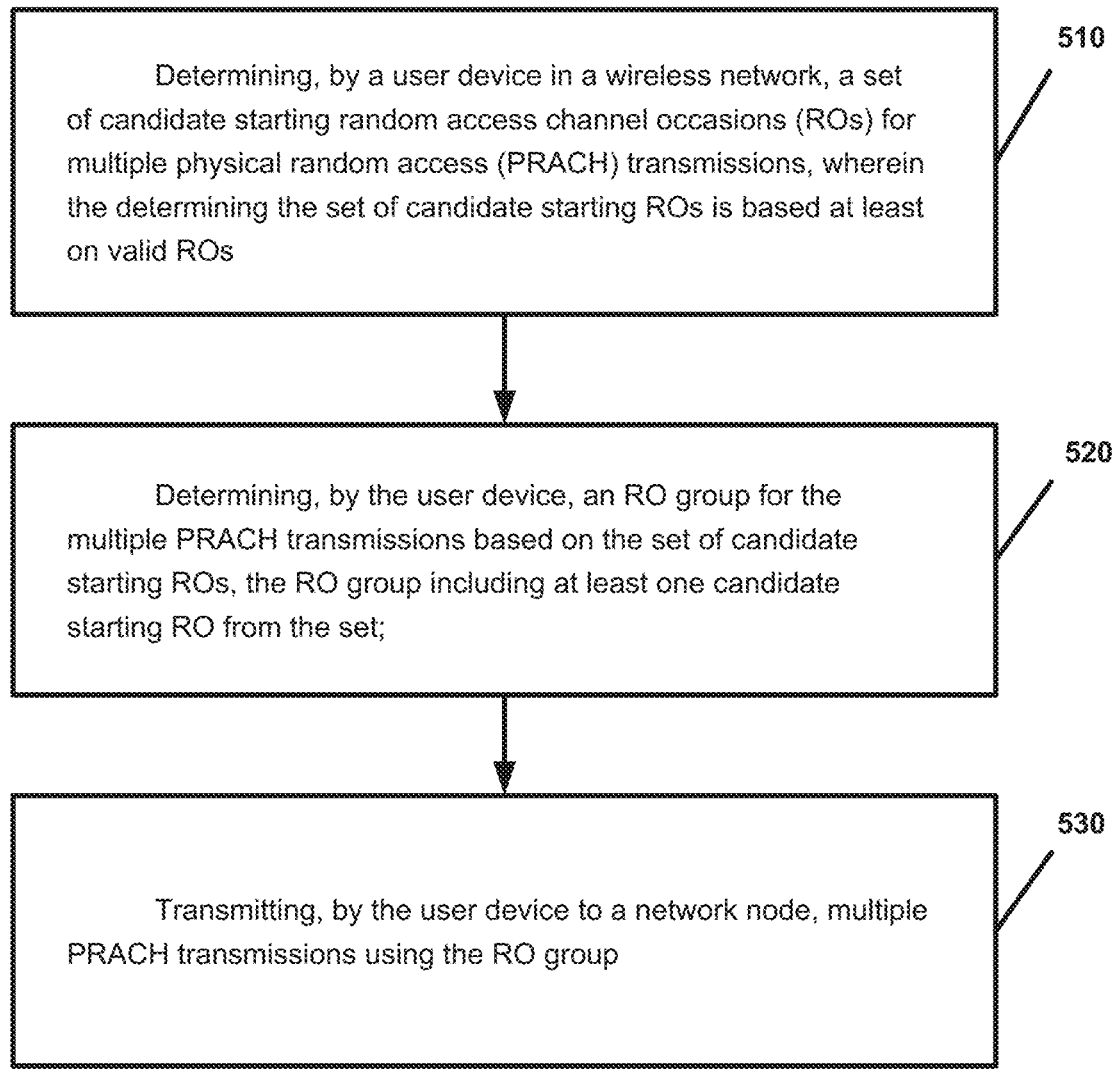
FIG. 5 is a flow chart illustrating operation of a user device (or UE) according to an example embodiment.

FIG. 5 is a flow chart illustrating operation of a user device (or UE) according to an example embodiment. Operation 510 includes determining, by a user device in a wireless network, a set of candidate starting random access channel occasions (ROs) for multiple physical random access (PRACH) transmissions, wherein the determining the set of candidate starting ROs is based at least on valid ROs. Operation 520 includes determining, by the user device, an RO group for the multiple PRACH transmissions based on the set of candidate starting ROs, the RO group including at least one candidate starting RO from the set. And, operation 530 includes transmitting, by the user device to a network node, multiple PRACH transmissions using the RO group.

With respect to the method of FIG. 5, the determining the set of candidate starting ROs is performed regardless of collision handling rules applied to the set of candidate starting ROs or independent of whether a PRACH transmission in the starting RO is dropped based on a collision with another RO.

With respect to the method of FIG. 5, the determining the set of candidate starting ROs is performed based on at least one of the following: a periodicity or a reference time.

With respect to the method of FIG. 5, the set of candidate starting ROs may include: a first subset of candidate starting ROs, wherein the first subset of candidate starting ROs are determined based on a reference time; and a second subset of candidate starting ROs, wherein the second subset of candidate starting ROs are separated from the first subset of candidate starting ROs by a starting RO periodicity or a RO group periodicity.

With respect to the method of FIG. 5, the valid ROs occur within a reference time period. Also, the reference time may include at least one of the following: a specific slot or frame, at a time offset from slot 0 of frame 0; a time of ROs that are closest to a start of a reference time period; or, a time of ROs that are at a time offset from ROs closest to a start of the reference time period.

With respect to the method of FIG. 5, the determining the set of candidate starting ROs may be performed based on an index of the valid ROs. Also, the index of the valid ROs may be equal to 0.

With respect to the method of FIG. 5, the method may further include determining, for each of the valid ROs, an index of an association pattern period to which the valid RO belongs; and wherein the determining the set of candidate starting ROs is performed based on the index of the association pattern period to which each of the valid ROs belong.

With respect to the method of FIG. 5, the valid ROs that belong to the association pattern period with index 0 may be determined to be part of the set of candidate starting ROs.

Figure 6:
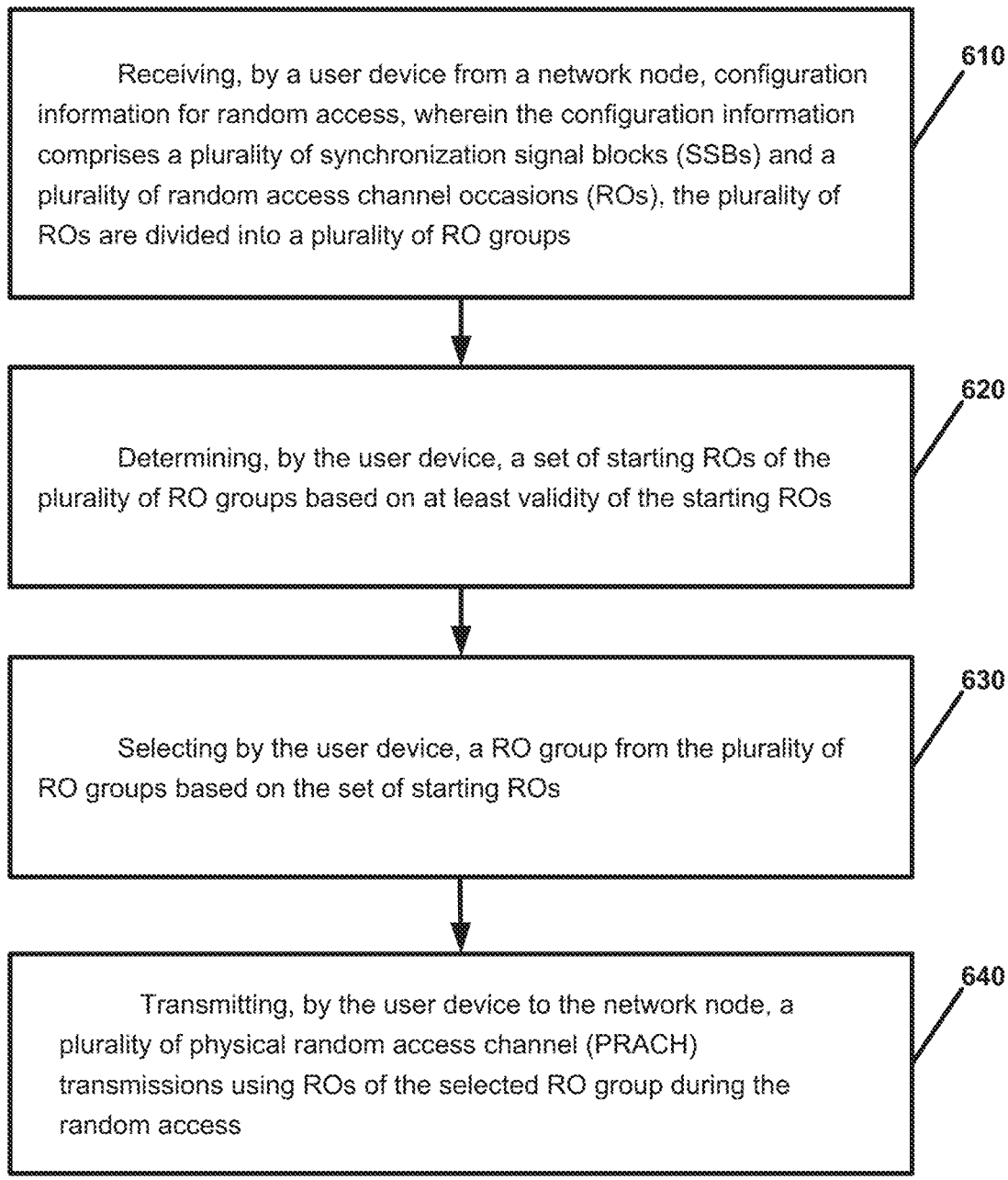
FIG. 6 is a flow chart illustrating operation of a user device (or UE) according to an example embodiment.

FIG. 6 is a flow chart illustrating operation of a user device (or UE) according to an example embodiment. Operation 610 includes receiving, by a user device (e.g., UE) from a network node (e.g., gNB), configuration information for random access, wherein the configuration information comprises a plurality of synchronization signal blocks (SSBs) and a plurality of random access channel (RACH) occasions (ROs), the plurality of ROs are divided into a plurality of RO groups. Operation 620 includes determining, by the user device, a set of starting ROs of the plurality of RO groups based on at least validity of the starting ROs. Operation 630 includes selecting by the user device, a RO group from the plurality of RO groups based on the set of starting ROs. And, operation 640 includes transmitting, by the user device to the network node, a plurality of physical random access channel (PRACH) transmissions using ROs of the selected RO group during the random access.

With respect to the method of FIG. 6, each starting RO of the set of starting ROs are valid, wherein an RO is valid if the RO is within uplink symbols to the network node or if the RO has a pre-determined or a minimum time gap after a last SSB symbol from the network node in case the RO is within one or more flexible symbols.

With respect to the method of FIG. 6, each starting RO of the set of starting ROs are valid, and an RO is valid if the RO is within uplink symbols to the network node.

With respect to the method of FIG. 6, the set of starting ROs are determined regardless of collision handling rules applied on ROs of the set of starting ROs.

With respect to the method of FIG. 6, the set of starting ROs may include a first subset of ROs and one or more additional subsets of ROs separated from the first subset of ROs. Also, for example, the set of starting ROs may occur within a reference time period. Also, for example, ROs in the first subset may each be at a same reference time or at different reference time associated with the plurality of SSBs. For example, the same or different reference time may be based on a time offset.

With respect to the method of FIG. 6, a reference time is constituted by (or may include) more than one association period that the ROs in the first subset belong to.

With respect to the method of FIG. 6, a value of the reference time period may be configured by the network node or determined by the user device. For example, the reference time period may be in units of time slots, radio frames or ROs. Also, in some cases, only one value of the reference time period may be configured or determined if only one value of the plurality of PRACH transmissions is configured. Also, for example, one or more values of the reference time period are configured or determined if more than one value of the plurality of PRACH transmissions is configured.

With respect to the method of FIG. 6, the set of starting ROs may be determined based on indices of the starting ROs.

The method of FIG. 6 may further include determining which ROs out of the starting ROs are to be used for the plurality of PRACH transmissions; and transmitting, to the network node, the plurality of PRACH transmissions using at least one of the ROs out of the starting ROs.

With respect to the method of FIG. 6, the at least one RO group is based only on a subset of the set of starting ROs closest to a time instance of the determination of the at least one RO group.

With respect to the method of FIG. 6, the method may further include selecting the RO group from the at least one RO group for the plurality of PRACH transmissions.

With respect to the method of FIG. 6, the at least one RO group may be determined based on each subset of starting ROs within an association reference time period.

With respect to the method of FIG. 6, the method may further include selecting the RO group from the at least one RO group for the plurality of PRACH transmissions that starts after a time instance of the determination of the at least one RO group. Further details and/or other examples will now be described.

1) UE may determine a set of starting ROs for or associated with a plurality of RO groups (e.g., there may be 1 starting RO for each RO group), for multiple PRACH (physical random access channel)/random access preamble transmissions. In some cases, starting ROs of RO groups may be selected that are valid RO(s). Thus, in some cases, validity of the RO may be a requirement to select the RO as a starting RO of a RO group. Also, in some cases, a RO may be selected as a starting RO of an RO group regardless of whether they are subject to collision handling rules or not, i.e., if they are dropped or not due to a collision.

1a) Starting ROs can be determined with a time offset and periodicity. In one embodiment, UE determines the set of starting ROs of RO groups as including a first subset of ROs, each of the ROs in the first subset is at a same or different reference time, and one or more additional subsets of ROs separated from the first subset of ROs according to one or more periodicity values. In one implementation, the set of starting ROs of RO groups occur within a reference time period (i.e., an interval of time, different than the above "same or different reference time"), wherein the reference time period is configured by network, determined by UE given network configuration or provided by specification. The one or more periodicity values are configured by the network or determined at the UE for example as the size of the RO groups created from the candidate starting ROs. The one or more periodicity values are in units of slots, frames or ROs. If only one value of the number of multiple PRACH transmission is configured, then only one periodicity value is configured or determined. If more than one value of the number of multiple PRACH transmission is configured, then one or more periodicity values are configured or determined. In the case only one periodicity value is configured or determined, in one embodiment the periodicity value is large enough to contain the RO group related to the largest number of multiple PRACH transmissions.

A same or different reference time may be defined for example based on a time offset/difference from the slot 0 of frame 0, or based on a time offset/difference from the starting time of a reference time period, or as the time of one or more reference ROs within a reference time period, or as a network configured value. In one implementation, the one or more reference ROs are defined as the closest ROs to the start of the reference time period, i.e., the first/earliest ROs of the reference time period. Reference ROs may be specific to a certain SSB index. In another implementation, the one or more reference ROs are defined as the ROs at a time offset/distance from the closest ROs from the start of the reference period. Reference ROs may be specific to a certain SSB index. The time offset is either network configured or predetermined at the UE. In one implementation, the reference ROs may include multiple ROs occurring in the same time instance and multiplexed in the frequency domain.

1b) In another embodiment, UE determines candidate starting ROs of RO groups based on an index of the ROs. In one implementation, UE determines ROs with index between 0 and M−1, where M is the inverse of the CHOICE part of the field "ssb-perRACH-OccasionAndCB-PreamblesPerSSB" in RACH-ConfigCommon IE, as candidate starting ROs. In another implementation, UE determines as candidate starting ROs, ROs with index equal to 0. In another implementation, UE determines as candidate starting ROs, ROs with index equal to one or more network configured values. In another implementation, UE determines as candidate starting ROs, ROs with index equal to one or more determined values. In another implementation, UE determines as candidate starting ROs, ROs with index satisfying certain constraints, e.g., mod (RO index, P)=0, where P is configured by NW or associated with the reference time period. Details on RO indexing are out of the scope of this invention, but it is assumed that UE is able to enumerate the configured ROs, at least within a reference time period.

1c) In another embodiment, UE determines candidate starting ROs of RO groups based on an index of the association period the RO belongs to. In one implementation, the index of the association period is the index within a group of association periods belonging to a reference time period. In one implementation, the indexes of the association periods containing the candidate starting ROs are determined at the UE based on specifications. In another implementation, the indexes of the association periods containing candidate starting ROs are determined at the UE based on network configuration, the network configuration containing an time offset/distance and/or a periodicity of the association periods containing candidate starting ROs. In one implementation, the time offset/difference is provided in units of slots or frames or association periods from slot number 0 in frame number 0. In one implementation, the time offset/difference is provided in units of slots or frames or association periods from a reference time, the reference time being for example a starting time of a reference time period. In one implementation, the periodicity is provided in units of slots or frames or association periods. In another implementation, the periodicity is provided in units of ROs.

1d) In another embodiment, UE further determines which ROs out of the determined set of starting ROs (based on the above embodiments) can be used for the multiple PRACH transmission or for a certain number of multiple PRACH transmissions. The further determination is based on network configuration of a subset of the determined set of starting ROs to be used (or not to be used) for the multiple PRACH transmission or for a certain number of multiple PRACH transmissions. In one implementation, the configuration is provided in the form of a bitmap, wherein the bitmap is of the size of the number of determined starting ROs (i.e., each bit of the bitmap is relative to one candidate starting RO) and wherein a bit value indicates that the candidate starting RO can be used for the multiple PRACH transmission and another bit value indicates that the candidate starting RO cannot be used for the multiple PRACH transmission. In one implementation, the configuration is provided in the form of multiple bitmaps, each bitmap associated to a certain number of multiple PRACH transmissions and wherein a bit value of a bitmap indicates that the candidate starting RO can be used for the certain number of multiple PRACH transmission and another bit value indicates that the candidate starting RO cannot be used for the certain number of multiple PRACH transmission.

1e) In another embodiment, UE determines which ROs out of the determined set of starting ROs (according to any of the above embodiments) are actually starting valid RO of an RO group for a first number of multiple PRACH transmission (N) subject to a condition on the number of subsequent valid ROs within the reference time period, consecutive in time, associated with a same SS/PBCH block index and using the same frequency resources as the starting RO. More precisely, the UE determines that a valid RO within the reference time period is a starting valid RO of an RO group for a first number of PRACH transmissions (N) if a second number of subsequent valid ROs (N−1) associated with a same SS/PBCH block index, consecutive in time and using the same frequency resources, can be determined within the reference time period. Alternatively, an RO in the set of candidate starting ROs is not considered as a starting valid RO of an RO group for a first number of multiple PRACH transmissions (N) if, within the reference time period, the candidate starting RO is not followed by a second number of subsequent valid ROs (N−1) consecutive in time, associated with a same SS/PBCH block index and using the same frequency resources as the starting RO, and the candidate starting RO and the number of subsequent valid ROs cannot be used to determine a RO group for the first number of multiple PRACH transmissions (N).

1f) In another embodiment, any RO in the determined set of starting ROs allows determining, within the reference time period, a second number of subsequent valid ROs (N−1) such that the candidate starting RO and the number of subsequent valid ROs can be used to determine an RO group for transmitting a first number of PRACH transmissions (N), and wherein the set of subsequent valid ROs are consecutive in time, associated with a same SS/PBCH block index and using the same frequency resources as the starting RO.

2a) In one embodiment, UE determination of one or more RO groups for transmission of the multiple PRACH transmissions may be based on the determined set of starting ROs. In one implementation, the determined one or more RO groups may be based on the subset of starting ROs closest (but later in time) to the time of the determination, and UE selects one of the one or more determined RO groups for transmission of the multiple PRACH transmissions. In another implementation, the determined one or more RO groups are based on all the subsets of candidate starting ROs within the reference period, and UE selects one of the one or more determined RO groups for transmission of the multiple PRACH transmissions that starts after the time of determination.

2b) In another embodiment, UE determination of one or more RO groups for transmission of a first number of multiple PRACH transmissions (N) may be based on the determined set of starting ROs wherein, for any RO in the set of candidate starting ROs, if, within the reference time period, the candidate starting RO is followed by a first number of subsequent valid ROs (M−1), which is smaller than a second number of subsequent valid ROs (N−1), and wherein the second number of subsequent valid ROs plus one is the total number of ROs in an RO group for the first number of multiple PRACH transmissions (N), the candidate starting RO is considered as a starting valid RO and used together with the first number of subsequent valid ROs (M−1) to determine an adaptive RO group (M ROs) for transmission of a second number of multiple PRACH transmissions (M) smaller than the first number of multiple PRACH transmissions (N).

Figure 7:
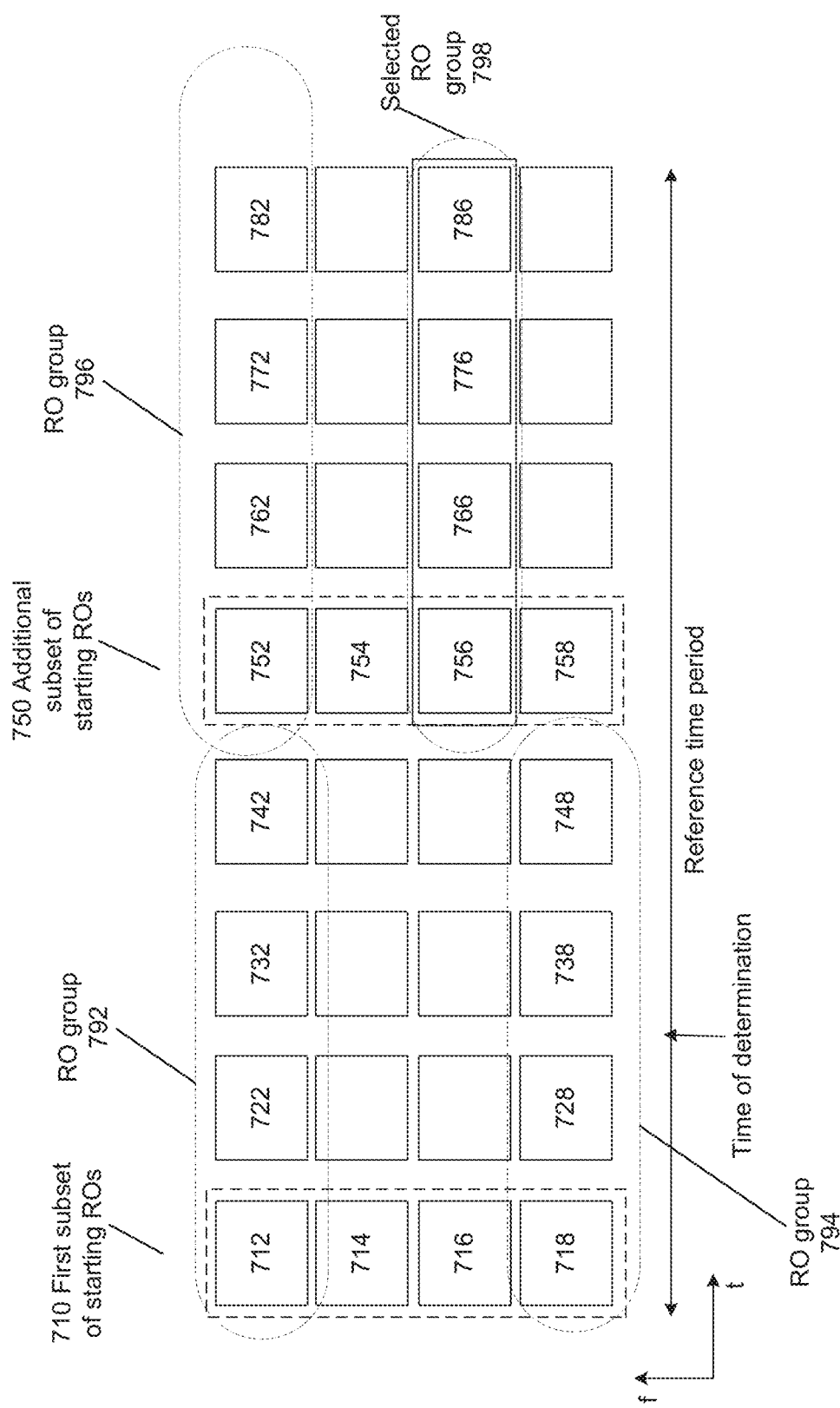
FIG. 7 is a diagram illustrating starting RACH occasions (ROs) for a plurality of RO groups according to an example embodiment.

FIG. 7 is a diagram illustrating starting RACH occasions (ROs) for a plurality of RO groups according to an example embodiment. As shown in FIG. 7, each box represents one RO in the time-frequency grid and each of the represented RO is mapped to the same SSB index and is not necessarily consecutive in the time and frequency domain (even if shown so for simplicity of representation). FIG. 7 illustrates eight starting ROs (712, 714, 716, 718, 752, 754, 756 and 758). There are four RO groups (792, 794, 796, 798) shown, with each RO group including four ROs. Each RO is shown with a box. The starting ROs are divided into two subsets of starting ROs, including a first subset (710) of starting ROs (e.g., including starting ROs 712, 714, 716 and 718) and an additional subset (750) of starting ROs (including starting ROs 752, 754, 756 and 758). Each starting RO is shown as a first RO of a respective or corresponding RO group. For example, RO group 792 includes a starting RO 712, and also ROs 722, 732 and 742. RO group 794 includes a starting RO 718, and also ROs 728, 738 and 748. RO group 796 includes a starting RO 752, and also ROs 762, 772 and 782. RO group 798 includes a starting RO 756, and also ROs 766, 776 and 786. The starting ROs 712, 714, 716 and 718 are provided in the same time resources (e.g., using same OFDM symbols), but are provided in (or multiplexed across) different frequency resources (e.g., different sets of subcarriers). The same is true for the RO groups of the additional set of starting ROs. RO group 792 and RO group 796 use the same frequency resources, but use different time resources. Each row of 8 ROs may use the same SSB index.

Step 1: UE determines that it needs to determine RO groups of 4 ROs to perform a number of 4 multiple PRACH transmissions. Determination of the RO group size (i.e., of the number of multiple PRACH transmissions) may be based on SSB-RSRP thresholds configured by the network. For example, the lower the RSRP of the selected SSB, then a higher or greater number of PRACH transmissions may be performed or required, e.g., to improve a probability of successful RACH procedure via gNB combining the multiple PRACH transmissions.

Step 2: UE determines a periodicity of the starting ROs based on the size of the RO groups it needs to determine, i.e., determines and sets the periodicity of the candidate starting ROs to 4 ROs mapped to the same SSB index.

Step 3: UE determines the reference time period (in this example including 8 ROs not necessarily consecutive but mapped to the same SSB index) based on network configuration or specification text.

Step 4: UE determines the first subset of starting ROs as the closest ROs to the start of the reference period, i.e., the first ROs of the reference time period. In this example, this first subset 710 of starting ROs may be determined, as in this example, these starting ROs may be closest ROs to the start of the reference time period. In this example, multiple frequency multiplexed ROs are the closest to the start of the reference period, but in other examples, only one RO could be the closest to the start of the reference period. It is to be noticed that when referring to the closest ROs to the start of the reference period, we refer to ROs mapped to a certain SSB index and closest to the start of the reference period among the ROs mapped to the certain SSB index and within the reference period.

Step 5: UE determines an additional subset of candidate starting ROs as all the frequency multiplexed ROs spaced by the determined periodicity in Step 2 from the first subset of candidate starting ROs, i.e., 4 ROs mapped to the same SSB index. In this example, the UE determines the additional subset 750 of starting ROs.

Step 6: UE determines one or more RO groups based on the first and additional subset of candidate ROs (embodiment 2.b.) and selects one of the one or more determined RO groups for transmission of the multiple PRACH transmissions that starts after the time of determination, i.e., the point in time wherein UE determines the RO groups. In this example, the UE may select RO group 798 (having starting RO 756), as this start after time of determination.

Figure 8:
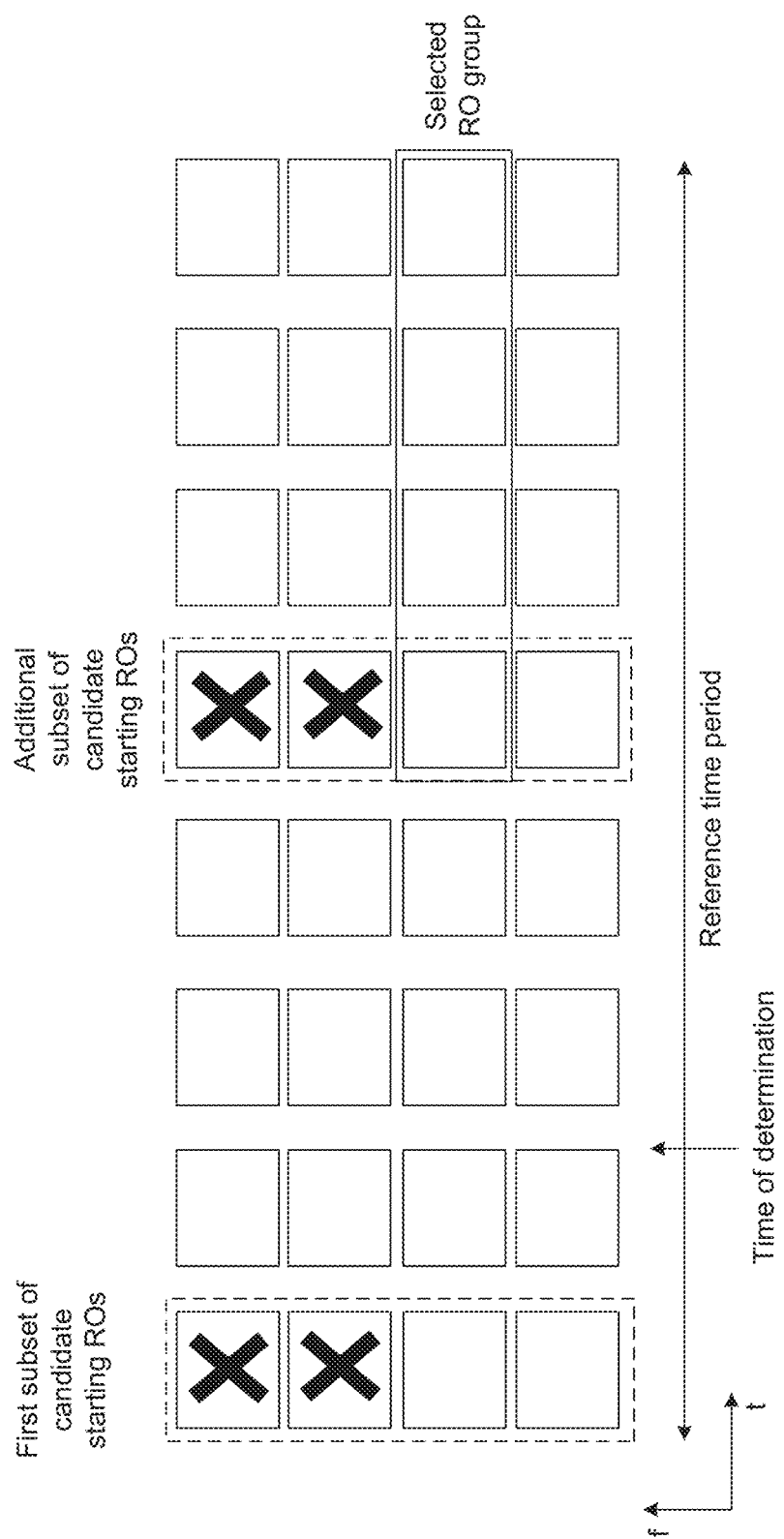
FIG. 8 is a diagram illustrating a determination of starting RACH occasions (ROs) further based on a network configuration.

FIG. 8 is a diagram illustrating a determination of starting RACH occasions (ROs) further based on a network configuration. In the example of FIG. 8, the UE determines the set of starting ROs as in the example of FIG. 7 but the UE further conditions the determination of set of starting ROs on a network configuration that indicates which ROs of the subsets can be used as starting ROs:

Step 1: UE determines that it needs to determine RO groups of 4 ROs to perform a number of 4 multiple PRACH transmissions. Determination of the RO group size (i.e., of the number of multiple PRACH transmissions) is based on SSB-RSRP thresholds configured by the network.

Step 2: UE determines a periodicity of the candidate starting ROs based on the size of the RO groups it needs to determine, i.e., determines and sets the periodicity of the candidate starting ROs to 4 ROs mapped to a same SSB index.

Step 3: UE determines the reference time period (in this example including 8 ROs not necessarily consecutive but mapped to the same SSB index).

Step 4: UE determines the first subset of candidate starting ROs as the closest ROs to the start of the reference period, i.e., the first ROs mapped to the same SSB index of the reference period. In this example, multiple frequency multiplexed ROs are the closest to the start of the reference period, but in other examples, only one RO could be the closest to the start of the reference period. It is to be noticed that when referring to the closest ROs to the start of the reference period, we refer to ROs mapped to a certain SSB index and closest to the start of the reference period among the ROs mapped to the certain SSB index and within the reference period.

Step 5: UE determines an additional subset of candidate starting ROs as all the frequency multiplexed ROs spaced by the determined periodicity in Step 2 from the first subset of candidate starting ROs, i.e., 4 ROs mapped to the same SSB index.

Step 6: UE conditions the determination of Steps 5 and 6 to network configuration of "barred" ROs (ROs with the X in FIG. 8), and so even if the barred ROs were initially part of the first and additional subsets of candidate starting ROs, UE does not consider them as starting ROs for the determination of RO groups in next Step 7 (embodiment 1.d.).

Step 7: UE determines one or more RO groups based on the first and additional subset of candidate ROs and based on the barred ROs (based on Step 6), and UE selects one of the one or more determined RO groups for transmission of the multiple PRACH transmissions that starts after the time of determination.

The example embodiments described herein provide methods for UE determination of the starting RO of RO groups, which is fundamental to ensure that there is no ambiguity in gNB receiver operation on which ROs to combine when receiving the multiple PRACH transmissions. The example embodiments allow a gNB to indicate only a subset of a set of determined candidates starting RO for creation of RO groups with specific number of multiple PRACH transmissions.

Some examples will now be described.

Example 1. A method comprising: determining, by a user device in a wireless network, a set of candidate starting random access channel occasions (ROs) for multiple physical random access (PRACH) transmissions, wherein the determining the set of candidate starting ROs is based at least on valid ROs; determining, by the user device, an RO group for the multiple PRACH transmissions based on the set of candidate starting ROs, the RO group including at least one candidate starting RO from the set; and transmitting, by the user device to a network node, multiple PRACH transmissions using the RO group.

Example 2. The method of Example 1, wherein the determining the set of candidate starting ROs is performed regardless of collision handling rules applied to the set of candidate starting ROs or independent of whether a PRACH transmission in the starting RO is dropped based on a collision with another RO.

Example 3. The method of any of Examples 1-2, wherein the determining the set of candidate starting ROs is performed based on at least one of the following: a periodicity or a reference time.

Example 4. The method of Example 1, wherein the set of candidate starting ROs comprise: a first subset of candidate starting ROs, wherein the first subset of candidate starting ROs are determined based on a reference time; and a second subset of candidate starting ROs, wherein the second subset of candidate starting ROs are separated from the first subset of candidate starting ROs by a starting RO periodicity or a RO group periodicity.

Example 5. The method of any of Examples 1-4, wherein the valid ROs occur within a reference time period.

Example 6. The method of Example 5, wherein the reference time period is given as a number of association pattern periods.

Example 7. The method of Example 4, wherein the reference time comprises at least one of the following: a specific slot or frame, at a time offset from slot 0 of frame 0; a time of ROs that are closest to a start of a reference time period; or, a time of ROs that are at a time offset from ROs closest to a start of the reference time period.

Example 8. The method of any of Examples 1-7, wherein the determining the set of candidate starting ROs is performed based on an index of the valid ROs.

Example 9. The method of Example 8, wherein the index of the valid ROs is equal to 0.

Example 10. The method of any of Examples 1-9, further comprising: determining, for each of the valid ROs, an index of an association pattern period to which the valid RO belongs; and wherein the determining the set of candidate starting ROs is performed based on the index of the association pattern period to which each of the valid ROs belong.

Example 11. The method of Example 10, wherein the valid ROs that belong to the association pattern period with index 0 are determined to be part of the set of candidate starting ROs.

Example 12. The method of any of Examples 5-10, wherein any RO in the set of candidate starting ROs is determined as starting valid ROs of an RO group for a first number of multiple PRACH transmissions, within the reference time period, if the candidate starting RO is followed by a second number of subsequent valid ROs consecutive in time, associated with a same SS/PBCH block index and using the same frequency resources as the starting RO, such that the candidate starting RO and the number of subsequent valid ROs can be used to determine an RO group for the first number of multiple PRACH transmissions.

Example 13. The method of any of Examples 5-10, wherein any RO in the set of candidate starting ROs of RO groups for a first number of multiple PRACH transmissions allows determining, within the reference time period, a second number of subsequent valid ROs, consecutive in time, associated with a same SS/PBCH block index and using the same frequency resources as the starting RO, such that the candidate starting RO and the second number of subsequent valid ROs are used to determine an RO group for transmitting a first number of multiple PRACH transmissions.

Example 14. The method of any of Examples 5-10, wherein for any RO in the set of candidate starting ROs of RO groups for a first number of multiple PRACH transmissions, if, within the reference time period, the candidate starting RO is followed by a first number of subsequent valid ROs, which is smaller than a second number of subsequent valid ROs, and wherein the second number of subsequent valid ROs plus one is the total number of ROs in an RO group for the first number of multiple PRACH transmissions, the candidate starting RO is a starting valid RO and can be used together with the first number of subsequent valid ROs to determine an adaptive RO group for a second number of multiple PRACH transmissions smaller than the first number of multiple PRACH transmissions.

Example 15. An apparatus comprising: at least one processor; and at least one memory including computer program code; the at least one memory and the computer program code configured to, with the at least one processor, cause the apparatus at least to perform the method of any of Examples 1-14.

Example 16. A non-transitory computer-readable storage medium comprising instructions stored thereon that, when executed by at least one processor, are configured to cause a computing system to perform the method of any of Examples 1-14.

Example 17. A user device comprising: at least one processor; and at least one memory including computer program code; the at least one memory and the computer program code configured to, with the at least one processor, cause the user device at least to perform: determine a set of candidate starting random access channel occasions (ROs) for multiple physical random access (PRACH) transmissions, wherein the determining the set of candidate starting ROs is based at least on valid ROs; determine an RO group for the multiple PRACH transmissions based on the set of candidate starting ROs, the RO group including at least one candidate starting RO from the set; and transmit, to a network node, multiple PRACH transmissions using the RO group.

Example 18. A user device comprising: means for determining a set of candidate starting random access channel occasions (ROs) for multiple physical random access (PRACH) transmissions, wherein the determining the set of candidate starting ROs is based at least on valid ROs; means for determining an RO group for the multiple PRACH transmissions based on the set of candidate starting ROs, the RO group including at least one candidate starting RO from the set; and means for transmitting, to a network node, multiple PRACH transmissions using the RO group.

Example 19. A method comprising: receiving, by a user device from a network node, configuration information for random access, wherein the configuration information comprises a plurality of synchronization signal blocks (SSBs) and a plurality of random access channel occasions (ROs), the plurality of ROs are divided into a plurality of RO groups; determining, by the user device, a set of starting ROs of the plurality of RO groups based on at least validity of the starting ROs; selecting by the user device, a RO group from the plurality of RO groups based on the set of starting ROs; and transmitting, by the user device to the network node, a plurality of physical random access channel (PRACH) transmissions using ROs of the selected RO group during the random access.

Example 20. The method of Example 19, wherein each starting RO of the set of starting ROs are valid, wherein an RO is valid if the RO is within uplink symbols to the network node or if the RO has a pre-determined or a minimum time gap after a last SSB symbol from the network node in case the RO is within one or more flexible symbols.

Example 21. The method of Example 19, wherein each starting RO of the set of starting ROs are valid, and an RO is valid if the RO is within uplink symbols to the network node.

Example 22. The method of any one of Examples 19-21, wherein the set of starting ROs are determined regardless of collision handling rules applied on ROs of the set of starting ROs.

Example 23. The method any of Examples 19-22, wherein the set of starting ROs comprises a first subset of ROs and one or more additional subsets of ROs separated from the first subset of ROs.

Example 24. The method of any of Examples 19-23, wherein the set of starting ROs occur within a reference time period.

Example 25. The method of Example 23, wherein ROs in the first subset are each at a same reference time or at different reference time associated with the plurality of SSBs.

Example 26. The method of Example 25, wherein the same or different reference time is based on a time offset.

Example 27. The method of any of Examples 24-26, wherein a reference time is constituted by more than one association periods the ROs in the first subset belong to.

Example 28. The method of Example 27, wherein a value of the reference time period is configured by the network node or determined by the user device.

Example 29. The method of any of Examples 27-28, wherein the reference time period is in units of time slots, radio frames or ROs.

Example 30. The method any of Examples 26-29, wherein only one value of the reference time period is configured or determined if only one value of the plurality of PRACH transmissions is configured.

Example 31. The method of any of Examples 26-29, wherein one or more values of the reference time period are configured or determined if more than one value of the plurality of PRACH transmissions is configured.

Example 32. The method of any of Examples 19-22, wherein the set of starting ROs are determined based on indices of the starting ROs.

Example 33. The method of any of Examples 19-22, further comprising: determining which ROs out of the starting ROs are to be used for the plurality of PRACH transmissions; and transmitting, to the network node, the plurality of PRACH transmissions using at least one of the ROs out of the starting ROs.

Example 34. The method of any of Examples 19-33, wherein the at least one RO group is based only on a subset of the set of starting ROs closest to a time instance of the determination of the at least one RO group.

Example 35. The method of Example 34, further comprising selecting the RO group from the at least one RO group for the plurality of PRACH transmissions.

Example 36. The method of Example 34, wherein the at least one RO group is determined based on each subset of starting ROs within an association reference time period.

Example 37. The method of Example 36, further comprising: selecting the RO group from the at least one RO group for the plurality of PRACH transmissions that starts after a time instance of the determination of the at least one RO group.

Example 38. An apparatus comprising: at least one processor; and at least one memory including computer program code; the at least one memory and the computer program code configured to, with the at least one processor, cause the apparatus at least to perform the method of any of Examples 19-37.

Example 39. A non-transitory computer-readable storage medium comprising instructions stored thereon that, when executed by at least one processor, are configured to cause a computing system to perform the method of any of Examples 19-37.

Example 40. An apparatus comprising means for performing the method of any of Examples 19-37.

Example 41. An apparatus comprising: at least one processor; and at least one memory including computer program code; the at least one memory and the computer program code configured to, with the at least one processor, cause the apparatus at least to: receive, by a user device from a network node, configuration information for random access, wherein the configuration information comprises a plurality of synchronization signal blocks (SSBs) and a plurality of random access channel occasions (ROs), the plurality of ROs are divided into a plurality of RO groups; determine, by the user device, a set of starting ROs of the plurality of RO groups based on at least validity of the starting ROs; selecting by the user device, a RO group from the plurality of RO groups based on the set of starting ROs; and transmitting, by the user device to the network node, a plurality of physical random access channel (PRACH) transmissions using ROs of the selected RO group during the random access.

Figure 9:
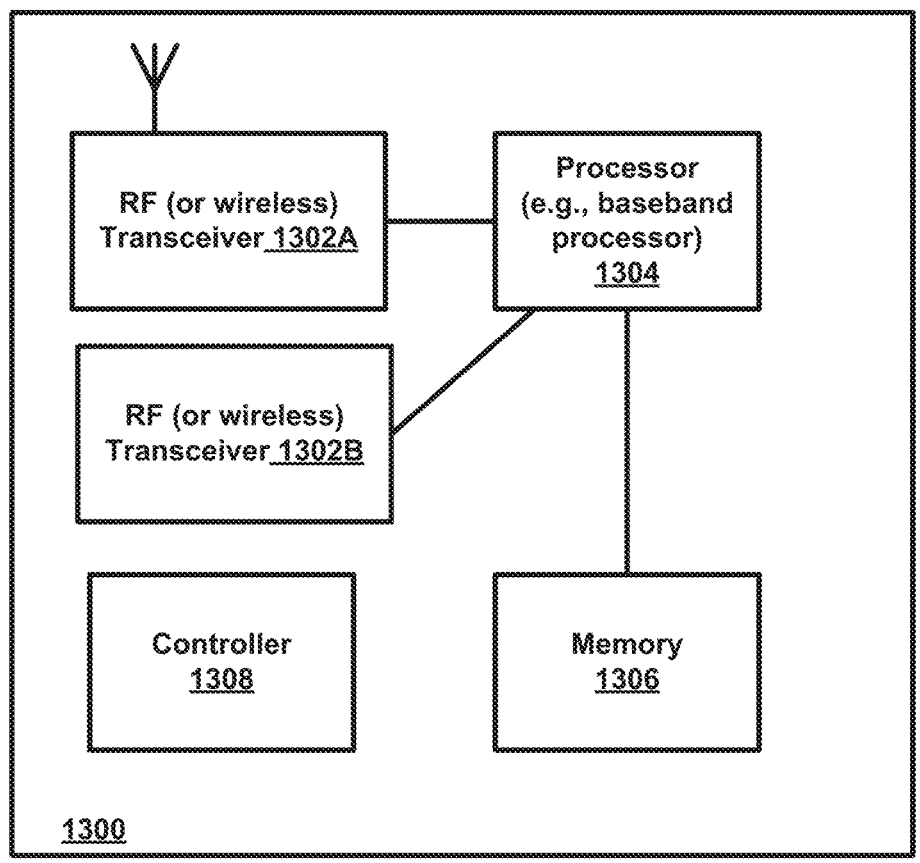
FIG. 9 is a block diagram of a wireless station or node (e.g., network node, user node or UE, relay node, or other node).

FIG. 9 is a block diagram of a wireless station or node (e.g., UE, user device, AP, BS, eNB, gNB, RAN node, network node, TRP, or other node) 1300 according to an example embodiment. The wireless station 1300 may include, for example, one or more (e.g., two as shown in FIG. 8) RF (radio frequency) or wireless transceivers 1302A, 1302B, where each wireless transceiver includes a transmitter to transmit signals and a receiver to receive signals. The wireless station also includes a processor or control unit/entity (controller) 1304 to execute instructions or software and control transmission and receptions of signals, and a memory 1306 to store data and/or instructions.

Processor 1304 may also make decisions or determinations, generate frames, packets or messages for transmission, decode received frames or messages for further processing, and other tasks or functions described herein. Processor 1304, which may be a baseband processor, for example, may generate messages, packets, frames or other signals for transmission via wireless transceiver 1302 (1302A or 1302B). Processor 1304 may control transmission of signals or messages over a wireless network, and may control the reception of signals or messages, etc., via a wireless network (e.g., after being down-converted by wireless transceiver 1302, for example). Processor 1304 may be programmable and capable of executing software or other instructions stored in memory or on other computer media to perform the various tasks and functions described above, such as one or more of the tasks or methods described above. Processor 1304 may be (or may include), for example, hardware, programmable logic, a programmable processor that executes software or firmware, and/or any combination of these. Using other terminology, processor 1304 and transceiver 1302 together may be considered as a wireless transmitter/receiver system, for example.

In addition, referring to FIG. 9, a controller (or processor) 1308 may execute software and instructions, and may provide overall control for the station 1300, and may provide control for other systems not shown in FIG. 9, such as controlling input/output devices (e.g., display, keypad), and/or may execute software for one or more applications that may be provided on wireless station 1300, such as, for example, an email program, audio/video applications, a word processor, a Voice over IP application, or other application or software.

In addition, a storage medium may be provided that includes stored instructions, which when executed by a controller or processor may result in the processor 1304, or other controller or processor, performing one or more of the functions or tasks described above.

According to another example embodiment, RF or wireless transceiver(s) 1302A/1302B may receive signals or data and/or transmit or send signals or data. Processor 1304 (and possibly transceivers 1302A/1302B) may control the RF or wireless transceiver 1302A or 1302B to receive, send, broadcast or transmit signals or data.

Figure 10:
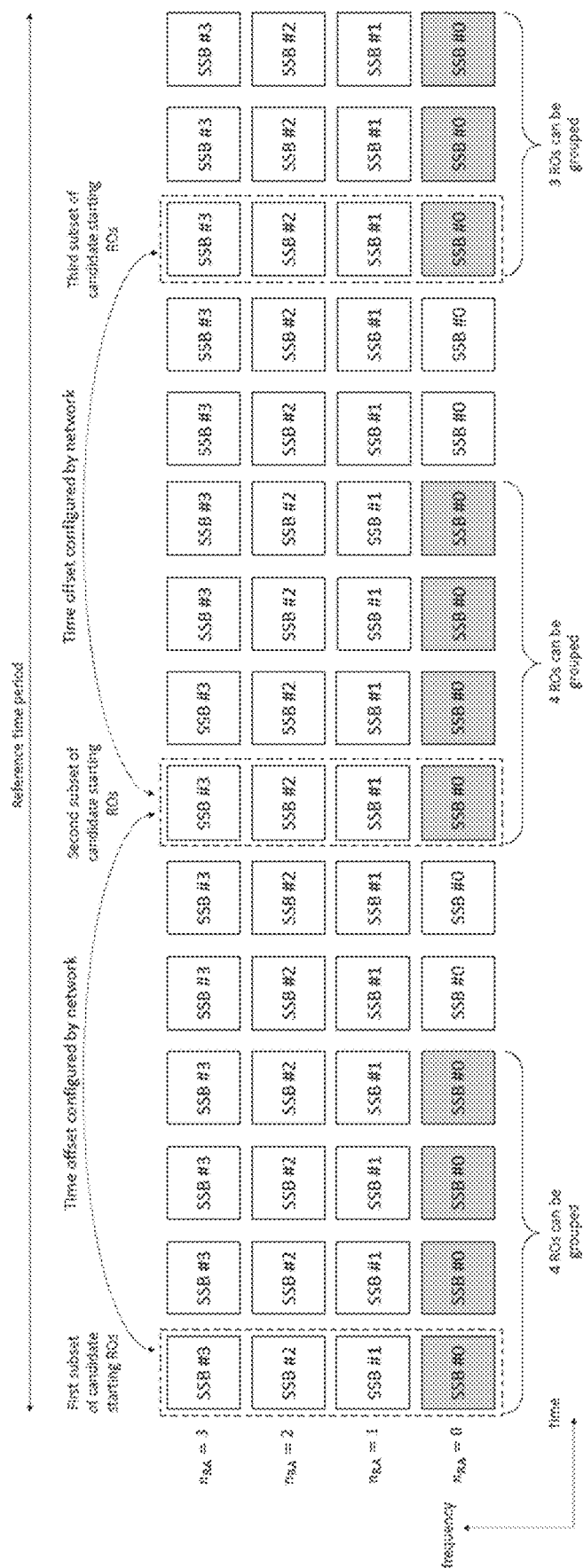
FIG. 10 is a diagram illustrating starting RACH occasions (ROs) for a plurality of RO groups according to an example embodiment.

FIG. 10 is a diagram illustrating starting RACH occasions (ROs) for a plurality of RO groups according to an example embodiment. Each box in FIG. 10 represents one RO in the time-frequency grid and each of the represented ROs is mapped to one SSB index. The first and additional subsets of candidate starting ROs within the reference time period are illustrated by using dashed boxes which surround subsets of frequency multiplexed ROs separated in time by a time offset (e.g., configured by network). Assuming the number of PRACH repetitions is four in this example, i.e., the number of valid ROs within an RO group is N=4, it is illustrated in FIG. 10 that, for each frequency resource and within the reference time period, one can find 3 (i.e., N−1) subsequent valid ROs consecutive in time, associated with a same SS/PBCH block index and using the same frequency resources as the starting RO, for any candidate starting RO in the first and second subset of candidate starting ROs. This is not the case for the candidate starting ROs in the third subset of candidate starting ROs, for which only 2 such subsequent valid ROs can be found, irrespective of the SS/PBCH block index mapped to and frequency resource of the considered starting RO. Two alternative solutions may be envisaged for this scenario according to the embodiments above. In one alternative, the starting RO determination is further constrained by a condition such that, only the starting RO candidates that are followed by at least N−1 valid ROs with the same frequency location within the reference time period are starting valid ROs. In other words, a valid RO is a first valid RO of N preamble repetitions if N−1 subsequent valid ROs associated with a same SS/PBCH block index, consecutive in time and using the same frequency resources, can be determined within the reference time period. Or yet in other words, every first valid RO allows determining a set of N valid ROs contained within the reference time period to transmit the N preamble repetitions. According to both alternative solutions, only 2 RO groups of 4 valid ROs would be determined within the reference time period in this example. In another alternative, and always with reference to FIG. 10, a starting RO candidate that is followed by M valid ROs associated with a same SS/PBCH block index, consecutive in time and using the same frequency resources within the reference time period, where M<(N−1), is also a first valid RO of a group for multiple PRACH transmissions and the RO group size of the RO group started with the starting RO is adapted to M valid ROs, where M=3 in this example.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer, or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a standalone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a backend component, e.g., as a data server, or that includes a middleware component, e.g., an application server, or that includes a frontend component, e.g., a client computer having a graphical user interface or a Web browser through which a user can interact with an embodiment, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:
   at least one processor; and
   at least one memory storing instructions that, when executed by the at least one processor, cause the apparatus at least to:
   determine at least one starting random access channel occasion (RO), wherein each of the at least one starting RO is a first valid RO of an RO set for a physical random access (PRACH) transmission with preamble repetitions, wherein the determining the at least one starting RO is based at least on valid ROs, and the at least one starting RO comprises:

a first subset of starting ROs, wherein the first subset of starting ROs are determined based on a reference time; and a second subset of starting ROs, wherein the second subset of starting ROs are separated from the first subset of starting ROs by a time offset between starting ROs;

determine an RO set for the PRACH transmission with preamble repetitions based on the determined at least one starting RO, the determined RO set including one of the at least one starting RO; and transmit to a network node, the PRACH transmission with preamble repetitions using the determined RO set.

2. The apparatus of claim 1, wherein the determining the at least one starting RO is performed regardless of collision handling rules applied to first valid RO(s) or independent of whether a PRACH transmission in the first valid RO(s) is dropped based on a collision with another PRACH transmission.

3. The apparatus of claim 1, wherein more than one time offsets between starting ROs are configured if there are more than one numbers of preamble repetitions.

4. The apparatus of claim 1, wherein the reference time comprises at least one of the following:
 a specific slot or frame, at a time offset from slot 0 of frame 0;
 a time of ROs that are closest to a start of a reference time period;
 a time of ROs that are at a time offset from ROs closest to a start of the reference time period.

5. The apparatus of claim 1, wherein the valid ROs occur within a reference time period.

6. The apparatus of claim 5, wherein the reference time period is given as a number of association pattern periods.

7. The apparatus of claim 5, wherein the instructions that, when executed by the at least one processor, cause the apparatus at least to:
 determine the reference time period.

8. The apparatus of claim 5, wherein any RO of the at least one starting RO is determined as starting valid RO of an RO set for a first number of the PRACH transmission with preamble repetitions, within the reference time period, if the RO of the at least one starting RO is followed by a second number of subsequent valid ROs consecutive in time, associated with a same SS/PBCH block index and using the same frequency resources as the starting RO, such that the starting RO and the number of subsequent valid ROs can be used to determine the RO set for the first number of the PRACH transmission with preamble repetitions.

9. The apparatus of claim 5, wherein any RO of the at least one starting RO of RO sets for a first number of the PRACH transmission with preamble repetitions allows determining, within the reference time period, a second number of subsequent valid ROs, consecutive in time, associated with a same SS/PBCH block index and using the same frequency resources as the RO, such that the starting RO and the second number of subsequent valid ROs are used to determine an RO set for transmitting a first number of the PRACH transmission with preamble repetitions.

10. The apparatus of claim 5, wherein for any RO of the at least one starting RO of RO sets for a first number of the PRACH transmission with preamble repetitions, if, within the reference time period, the starting RO is followed by a first number of subsequent valid ROs, which is smaller than a second number of subsequent valid ROs, and wherein the second number of subsequent valid ROs plus one is the total number of ROs in an RO set for the first number of the PRACH transmission with preamble repetitions, the starting RO is a starting valid RO and can be used together with the first number of subsequent valid ROs to determine an adaptive RO group for a second number of the PRACH transmission with preamble repetitions smaller than the first number of the PRACH transmission with preamble repetitions.

11. The apparatus of claim 1, wherein the determining the at least one starting RO is performed based on an index of the valid ROs.

12. The apparatus of claim 11, wherein the index of the valid ROs is equal to 0.

13. The apparatus of claim 1, wherein the instructions that, when executed by the at least one processor, cause the apparatus at least to:
 determine, for each of the valid ROs, an index of an association pattern period to which the valid ROs belong; and
 wherein the determining the at least one starting RO is performed based on the index of the association pattern period to which each of the valid ROs belong.

14. The apparatus of claim 13, wherein the valid ROs that belong to the association pattern period with index 0 are determined to be part of the at least one starting RO.

15. The apparatus of claim 1, wherein the instructions that, when executed by the at least one processor, cause the apparatus at least to:
 determine a plurality of RO sets for the PRACH transmission with preamble repetitions, based only on a subset of the at least one starting RO closest to a time instance of the determination of the plurality of RO sets.

16. The apparatus of claim 15, wherein the determined RO set is selected from the plurality of RO sets and starts after the time instance of the determination of the plurality of RO sets.

17. A method, comprising:
 determining, by a user device in a wireless network, at least one starting random access channel occasion (RO), wherein each of the at least one starting RO is a first valid RO of an RO set for a physical random access (PRACH) transmission with preamble repetitions, wherein the determining the at least one starting RO is based at least on valid ROs, and the at least one starting RO comprises:
 a first subset of starting ROs, wherein the first subset of starting ROs are determined based on a reference time; and
 a second subset of starting ROs, wherein the second subset of starting ROs are separated from the first subset of starting ROs by a time offset between starting ROs;
 determining, by the user device, an RO set for the PRACH transmission with preamble repetitions based on the determined at least one starting RO, the determined RO set including one of the at least one starting RO; and
 transmitting, by the user device to a network node, the PRACH transmission with preamble repetitions using the determined RO set.

18. A non-transitory computer-readable storage medium comprising instructions stored thereon that, when executed by at least one processor, are configured to cause a computing system to perform:
 determining at least one starting random access channel occasion (RO), wherein each of the at least one starting RO is a first valid RO of an RO set for a physical random access (PRACH) transmission with preamble repetitions, wherein the determining the at least one starting RO is based at least on valid ROs, and the at least one starting RO comprises:
  a first subset of starting ROs, wherein the first subset of starting ROs are determined based on a reference time; and
  a second subset of starting ROs, wherein the second subset of starting ROs are separated from the first subset of starting ROs by a time offset between starting ROs;
determining an RO set for the PRACH transmission with preamble repetitions based on the determined at least one starting RO, the determined RO set including one of the at least one starting RO; and
transmitting to a network node, the PRACH transmission with preamble repetitions using the determined RO set.

* * * * *